No. 856,982. PATENTED JUNE 11, 1907.
E. H. McCLINTOCK.
MOLD FOR PLASTIC MATERIAL.
APPLICATION FILED JUNE 11, 1906.
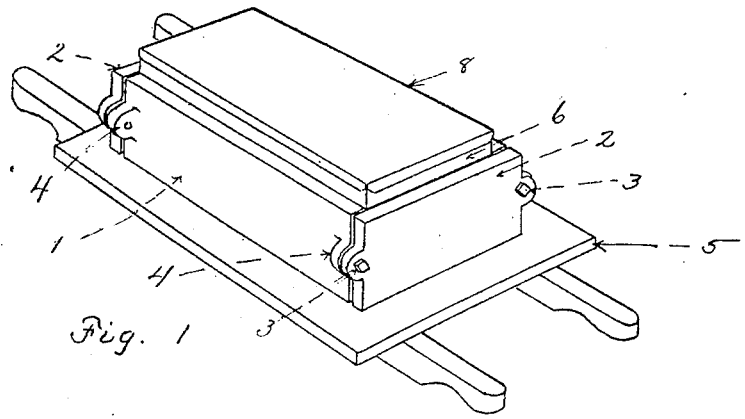
Fig. 1
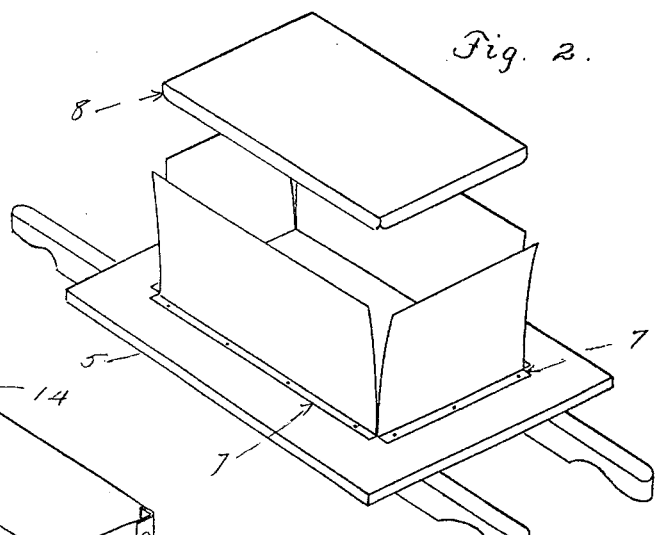
Fig. 2.
Fig. 3.
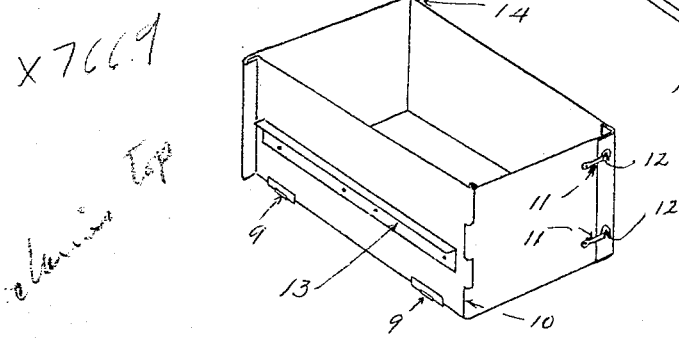
Witnesses:
Aaron F. Randall
Oscar F. Hill
Inventor:
Edward H. McClintock
by Nathan B. Day
Attorney.

UNITED STATES PATENT OFFICE.

EDWARD H. McCLINTOCK, OF WEST SOMERVILLE, MASSACHUSETTS, ASSIGNOR OF ONE-HALF TO EDWARD B. MARTIN, JOHN D. CROSBY, AND CHESTER S. DAY, AND ONE-FOURTH TO ARTHUR S. MARTIN, ALL OF BOSTON, MASSACHUSETTS.

MOLD FOR PLASTIC MATERIAL.

No. 856,982.  Specification of Letters Patent.  Patented June 11, 1907.

Application filed June 11, 1906. Serial No. 321,275.

*To all whom it may concern:*

Be it known that I, EDWARD H. McCLINTOCK, a citizen of the United States, residing at West Somerville, in the county of Middlesex and State of Massachusetts, have invented certain new and useful Improvements in Molds for Plastic Material, of which the following is a specification.

My invention in general relates to a mode of and means for molding into blocks or other shapes, plastic material so thin in consistency as to make it desirable to have a mold substantially proof against leakage and furnishing a temporary support until such plastic material hardens enough to permit handling.

I shall hereinafter more particularly describe my invention as applied to the manufacture of cement building blocks made from the so called "wet mixtures" and affording a means of producing said blocks without entailing the large outlay which without my invention would be required for block machines or molds.

In the drawings, Figure 1 is a perspective view showing my invention. Fig. 2 is a view of the same in which the outer mold is removed to show more clearly the pallet, the inner mold lining, and the cover therefor. Fig. 3 is a view showing a modified form of said mold lining, and illustrating various details of construction referred to in the specification.

Referring to the drawings Fig. 1 shows a simple form of mold having its sides 1, 1, and ends 2, 2, formed of preferably metal plates secured together in any usual manner, as by bolts 3, 3, engaging the lugs 4, 4. The mold is shown resting upon a pallet 5, serving as the bottom of the mold and, if desired, adapted to impart superficial markings to the surface of the block with which it is in contact. The pallet 5 carries the inner mold lining 6, more clearly shown in its preferred form in Fig. 2. The said inner lining is adapted to fit closely within the mold, and preferably consists of sheet metal pieces forming the ends and sides and secured to the pallet by means of the bent over lip portions 7, 7.

Before the inner lining is put into the mold the side and end pieces, though meeting at their bases preferably, have a tendency to spring outwardly from the base upward, as is shown in Fig. 2. When, however, the inner lining is placed into its position within the mold, the adjacent edges of the sides and ends of the mold lining are brought closely together in contact throughout their length so as to make said inner lining substantially proof against leakage along the contacting edges. The mold with the inner lining in place may now be filled with a cementitious mixture, and tamped; the mold meanwhile giving the necessary support to the thin metal sides and ends of the inner lining. When the tamping is completed the mold may be removed, a temporary mode of support being first provided for holding together the sides and ends of the inner lining. For this purpose I preferably use a cover 8 adapted to fit over the top edges of the side and end pieces of the inner lining which project somewhat from the mold as appears in Fig. 2. With the cover in place the sides and ends of the inner lining are held together sufficiently to prevent material leakage of the cement therein contained when the mold is removed.

The mold, with its inner lining having been filled and tamped, and the cover 8, or other means of temporarily maintaining the inner lining in its leakage proof condition having been put into operative position, the outside or main mold may be taken apart by releasing the fastenings by which its component parts are held together, so as to permit its removal from the pallet and the inner lining. The removal of this main mold leaves the molded article resting on the pallet and maintained in its molded form by the inner lining, the sides of which being held together by the temporary locking devices used, in substantially leakage proof relation, retain the plastic mass in its molded form until set. When set the cover 8 may be removed from the lining allowing the sides and ends of the lining to spring apart and away from the block molded therein, and permitting the same to be easily removed to a convenient place for further aging.

The advantages arising from the use of an inner lining with the mold as above set forth become evident when it is borne in mind that the molds of ordinary block machines are not made with such closely fitting joints as to make the use of a wet cementitious mixture practicable; and even if such were the case, the impossibility of handling the block until set would tie up each machine for a considerable time. However by the use of an inner lining not only is the mold rendered substantially leakage proof, but the support afforded by the lining enables the block to be at once removed from the machine and renders a large output possible by the slight additional cost of a stock of linings.

While I have hereinbefore described the inner lining in its preferred form and as attached to the pallet, the lining may be entirely independent thereof and embody various modifications. Thus in Fig. 3 the lining is shown as substantially an open sheet metal box, having a bottom attached by hinges 9, 9, and adapted to rest upon a pallet of any usual type. The sides and ends may also be hinged together as at 10, and hooks 11, 11, engaging pins 12, 12, may serve as a locking device in place of the cover 8. In case a very wet mixture is used, the lining may be made with interlocking joints as at 14 in order to insure the mold being leakage proof. Where a very long block is molded it may be advisable to have a stiffening strip 13 along the side of the lining. It is of course understood that where the modifications as above suggested are employed it may be necessary to provide recesses in the outer mold adapted to receive any projections on the inner lining due to such modifications.

In case it is desired to mold a block principally of a "dry mixture," but having a top layer of a "wet mixture," a lining constructed on the principles shown in Fig. 3, but having no bottom, may be employed to advantage. In such case the main or outer mold without any inner lining therein may be filled to the desired depth with the "dry mixture." The bottomless lining constructed of separable portions temporarily held in leakage proof relation to each other by means of hinges, pins and hooks, as shown in Fig. 3, or by other appropriate devices, is then put in place inside the main mold so that its lower edge rests on, and is for a short distance embedded in, the top of the mass of "dry mixture" already in place in the mold. Thus there is provided a leakage proof lining for the mold extending from the mass of "dry mixture" to the top of the mold, leakage at the bottom of the said lining being prevented by the "dry mixture" in which its lower edge is embedded. The "wet mixture" may now be poured into the upper or lined portion of the mold and the necessary tamping performed. After tamping the outer mold may be removed in same manner as is described in a previous portion of this specification, leaving on the pallet the molded block of "dry mixture" carrying on its upper part the leakage proof lining containing the "wet mixture," and adapted to maintain the same in its molded form until set, when the fastening or locking devices on the inner lining may be released, so as to permit the separation of the parts of the inner lining and to allow its removal from the block. An obvious variation of this method of using the bottomless lining as just described, would be to have the same put in place in the mold before the partial filling of the mold with the "dry mixture."

While my invention is herein above described more particularly with reference to cementitious mixtures it is applicable for use in case of any material which being molded in a more or less plastic condition becomes subsequently hardened.

Having described my invention, what I claim as new and desire to secure by Letters Patent is:

1. The combination in a mold for plastic material, of a main mold, a lining for said main mold consisting of separable portions adapted, when in position in the mold, to fit together in substantially leakage proof relation, and means for retaining said separable portions in said leakage proof relation after the removal of the main mold.

2. The combination in a mold for plastic material, of a main mold, and an inner lining contained within said main mold, said inner lining being substantially proof against leakage when in its position in the main mold, and being provided with means for temporarily maintaining the same in its leakage proof condition after its removal from the said main mold.

3. The combination in a mold for plastic material of a main mold and an inner lining adapted to fit within said main mold, said inner lining being composed of metal plates mounted on the pallet and normally springing outwardly with respect to each other, but, when in position in said main mold, having their edges held in contact so as to render said lining substantially proof against leakage, and having means for holding said sides temporarily in contact after the removal of said lining from the inner mold.

4. The combination in a mold for plastic material, of a main mold, and an inner lining adapted to fit within said main mold, said inner lining having its various surfaces hinged to adjacent surfaces and having means for temporarily locking said surfaces together whereby the said inner lining is maintained in a substantially leakage proof condition.

In testimony whereof I, affix my signature in presence of two witnesses.

EDWARD H. McCLINTOCK.

Witnesses:
  NATHAN B. DAY,
  WILLIAM A. COPELAND.